US012617031B2

(12) United States Patent
Fukuda et al.

(10) Patent No.: US 12,617,031 B2
(45) Date of Patent: May 5, 2026

(54) CUTTING TOOL AND CUTTING PROCESSING DEVICE

(71) Applicants: Sumitomo Electric Hardmetal Corp., Itami (JP); Komatsu NTC Ltd., Nanto-city (JP); Big Daishowa Seiki Co., Ltd., Higashiosaka (JP)

(72) Inventors: Hirochika Fukuda, Itami (JP); Takuya Nishimura, Itami (JP); Masanori Kakui, Nanto-city (JP); Manabu Tsujino, Nanto-city (JP); Tatsuya Ogata, Higashiosaka (JP)

(73) Assignees: SUMITOMO ELECTRIC HARDMETAL CORP., Itami (JP); KOMATSU NTC LTD., Nadto (JP); BIG DAISHOWA SEIKI CO., LTD, Higashiosaka (JP)

( * ) Notice: Subject to any disclaimer, the term of this patent is extended or adjusted under 35 U.S.C. 154(b) by 552 days.

(21) Appl. No.: 18/021,394

(22) PCT Filed: Jul. 8, 2021

(86) PCT No.: PCT/JP2021/025777
§ 371 (c)(1),
(2) Date: Feb. 15, 2023

(87) PCT Pub. No.: WO2022/038917
PCT Pub. Date: Feb. 24, 2022

(65) Prior Publication Data
US 2023/0302544 A1 Sep. 28, 2023

(30) Foreign Application Priority Data
Aug. 18, 2020 (JP) ................................. 2020-137877

(51) Int. Cl.
B23C 5/08 (2006.01)
B23C 5/00 (2006.01)

(52) U.S. Cl.
CPC ................ B23C 5/003 (2013.01); *B23C 5/08* (2013.01)

(58) Field of Classification Search
CPC . B23C 5/003; B23C 2250/16; B23B 2250/16; B23B 27/002; B23D 61/0275
See application file for complete search history.

(56) References Cited

U.S. PATENT DOCUMENTS 7,284,460 B2 * 10/2007 Yamamoto ......... B23Q 11/0035
74/573.1
8,128,101 B2 * 3/2012 Retzbach ............ B23B 31/1179
408/239 R
(Continued)

FOREIGN PATENT DOCUMENTS

CN 205147428 U 4/2016
CN 108422022 A 8/2018
(Continued)

*Primary Examiner* — Ryan Rufo
(74) *Attorney, Agent, or Firm* — XSENSUS LLP

(57) ABSTRACT

A cutting tool is rotatable about an axis line, and includes a main body portion, a cutting insert, and a plurality of anti-vibration members. The main body portion has an inner circumferential surface and an outer circumferential surface opposite to the inner circumferential surface. The cutting insert is attached to at least one of the inner circumferential surface and the outer circumferential surface. Each of the plurality of anti-vibration members is provided at the main body portion. Each of the plurality of anti-vibration members includes a weight member composed of a material having a specific gravity larger than a specific gravity of a material of the main body portion.

6 Claims, 14 Drawing Sheets

(56) References Cited

U.S. PATENT DOCUMENTS

| | | | | |
|---|---|---|---|---|
| 11,000,903 B2 * | 5/2021 | Thelin | ................... | B23B 29/022 |
| 2005/0279598 A1 * | 12/2005 | McPherson | ............. | F16F 7/108 |
| | | | | 188/378 |
| 2007/0257413 A1 * | 11/2007 | Retzbach | ........... | B23B 31/1179 |
| | | | | 409/141 |
| 2012/0003055 A1 * | 1/2012 | Sasaki | .................... | F16F 15/08 |
| | | | | 408/143 |
| 2015/0165531 A1 * | 6/2015 | Miyamoto | ................ | B23C 5/08 |
| | | | | 407/51 |
| 2016/0045960 A1 * | 2/2016 | Hecht | .................... | B23B 27/08 |
| | | | | 407/66 |
| 2017/0173701 A1 * | 6/2017 | Hecht | .................... | B23B 27/08 |
| 2017/0197258 A1 * | 7/2017 | Frota de Souza Filho | .................. | |
| | | | | B23C 5/006 |
| 2020/0147698 A1 * | 5/2020 | Buck | .................... | B23B 29/022 |
| 2021/0008642 A1 * | 1/2021 | Chen | .................... | B23B 31/208 |

FOREIGN PATENT DOCUMENTS

| | | | | | |
|---|---|---|---|---|---|
| JP | 5-70819 | U | | 9/1993 | |
| JP | 2000-107923 | A | | 4/2000 | |
| JP | 2003-62704 | A | | 3/2003 | |
| JP | 2005-40907 | A | | 2/2005 | |
| JP | 2007-210036 | A | | 8/2007 | |
| JP | 2007-290047 | A | | 11/2007 | |
| JP | 2013-230544 | A | | 11/2013 | |
| JP | 2015-116635 | A | | 6/2015 | |
| JP | 2018-537297 | A | | 12/2018 | |
| KR | 20100057138 | A | * | 5/2010 | .............. B23C 1/14 |
| KR | 2011-0113867 | A | | 10/2011 | |
| WO | 2017/109771 | A2 | | 6/2017 | |

* cited by examiner

65

71

72

X : RADIAL DIRECTION

Z : CIRCUMFERENTIAL DIRECTION

Y : AXIAL DIRECTION

CUTTING TOOL AND CUTTING PROCESSING DEVICE

CROSS-REFERENCE TO RELATED APPLICATIONS

The present application is based on PCT filing PCT/JP2021/025777, filed on Jul. 8, 2021, which claims priority to Japanese Patent Application No. 2020-137877, filed on Aug. 18, 2020, the entire contents of each are incorporated herein by reference.

TECHNICAL FIELD

The present disclosure relates to a cutting tool and a cutting processing device.

BACKGROUND ART

Japanese Patent Laying-Open No. 2007-210036 (PTL 1) discloses a pin miller cutter for processing a crankshaft. The pin miller cutter has an insert, a main body portion, and an adapter. The insert is attached on the inner circumferential side of the main body portion. The adapter is attached on the outer circumferential side of the main body portion.

CITATION LIST

Patent Literature

PTL 1: Japanese Patent Laying-Open No. 2007-210036

SUMMARY OF INVENTION

A cutting tool according to the present disclosure is a cutting tool rotatable about an axis line, and includes a main body portion, a cutting insert, and a plurality of anti-vibration members. The main body portion has an inner circumferential surface and an outer circumferential surface opposite to the inner circumferential surface. The cutting insert is attached to at least one of the inner circumferential surface and the outer circumferential surface. Each of the plurality of anti-vibration members is provided at the main body portion. Each of the plurality of anti-vibration members includes a weight member composed of a material having a specific gravity larger than a specific gravity of a material of the main body portion.

DETAILED DESCRIPTION

Figure 1:
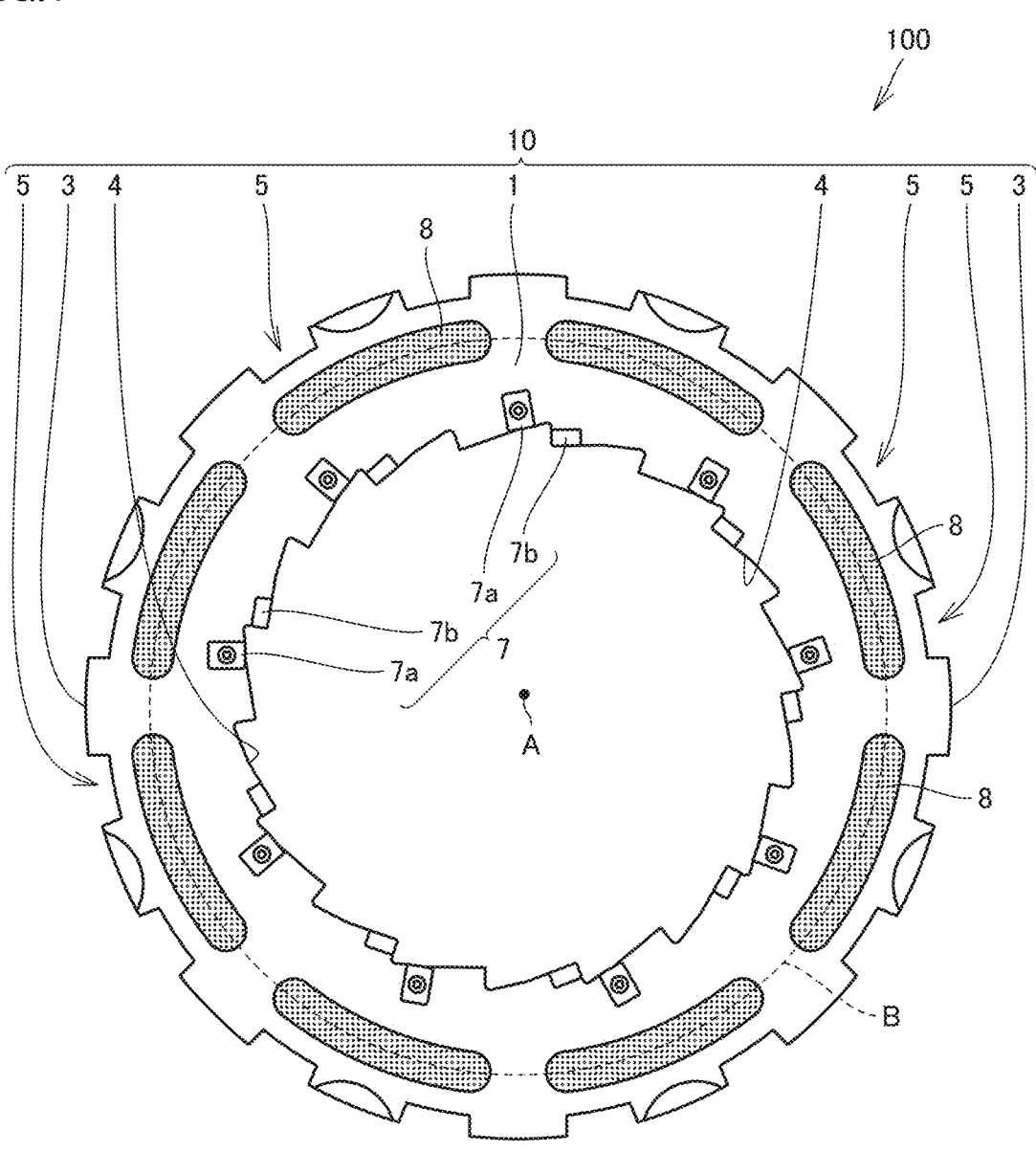
FIG. 1 is a schematic plan view showing a configuration of a cutting tool according to a first embodiment.

Problem to be Solved by the Present Disclosure

In the pin miller cutter, a filler having a specific gravity larger than that of the material of the adapter is provided in a recess formed in the adapter. Therefore, vibration generated due to contact of the insert with a workpiece is propagated to the adapter via the main body portion. Since the main body portion is located between the adapter and the insert, vibration to be damped cannot be sufficiently absorbed in the filler provided in the adapter. Therefore, vibration during a cutting process cannot be sufficiently attenuated.

It is an object of the present disclosure to provide a cutting tool and a cutting processing device, by each of which vibration during a cutting process can be attenuated.

Advantageous Effect of the Present Disclosure

According to the present disclosure, there can be provided a cutting tool and a cutting processing device, by each of which vibration during a cutting process can be attenuated.

Description of Embodiments

First, embodiments of the present disclosure will be listed and described.

(1) A cutting tool 100 according to the present disclosure is a cutting tool 100 rotatable about an axis line A, and includes a main body portion 10, a cutting insert 7, and a plurality of anti-vibration members 8. Main body portion 10 has an inner circumferential surface 4 and an outer circumferential surface 3 opposite to inner circumferential surface 4. Cutting insert 7 is attached to at least one of inner circumferential surface 4 and outer circumferential surface 3. Each of the plurality of anti-vibration members 8 is provided at main body portion 10. Each of the plurality of anti-vibration members 8 includes a weight member 20 composed of a material having a specific gravity larger than a specific gravity of a material of main body portion 10.

In cutting tool 100 according to (1), each of the plurality of anti-vibration members 8 is provided at main body portion 10. Cutting insert 7 is attached to main body portion 10. Therefore, vibration generated when cutting insert 7 comes into contact with a workpiece is attenuated by each of the plurality of anti-vibration members 8 provided at main body portion 10. Thus, vibration during a cutting process can be efficiently attenuated as compared with a cutting tool 100 in which anti-vibration member 8 is provided at an adapter.

(2) In cutting tool 100 according to (1), when viewed in a direction along axis line A, each of the plurality of anti-vibration members 8 may be disposed on an imaginary circle B centered on axis line A. Thus, distances between axis line A and the plurality of anti-vibration members 8 are the same, with the result that vibration during a cutting process can be more efficiently attenuated.

(3) In cutting tool 100 according to (2), when viewed in the direction along axis line A, the plurality of anti-vibration members 8 may be disposed at equal intervals in a circumferential direction of imaginary circle B. Thus, vibration during a cutting process can be uniformly attenuated in the circumferential direction.

(4) In cutting tool 100 according to any one of (1) to (3), main body portion 10 may be provided with a hollow portion 9 surrounded by an inner wall surface 6. Weight member 20 may be disposed in hollow portion 9 with weight member 20 being separated from inner wall surface 6. Since weight member 20 is separated from inner wall surface 6, weight member 20 is movable in hollow portion 9. Thus, weight member 20 is vibrated in a phase opposite to that of the vibration of main body portion 10. Therefore, anti-vibration member 8 functions as a dynamic vibration absorber. Therefore, as compared with a case where weight member 20 is in contact with inner wall surface 6, vibration during a cutting process can be further attenuated.

(5) In cutting tool 100 according to (4), weight member 20 may be provided with a through hole 24. Each of the plurality of anti-vibration members 8 may include: a pin member 12 that extends through through hole 24 and that is attached to inner wall surface 6; and an elastic member 13 that surrounds pin member 12 and that is in contact with weight member 20 in through hole 24. Weight member 20 can attenuate vibration by friction between weight member 20 and elastic member 13 and friction between elastic member 13 and pin member 12. Therefore, not only vibration in the radial direction but also vibration in each of the axial direction and the circumferential direction can be efficiently attenuated.

(6) In cutting tool 100 according to any one of (1) to (5), when viewed in a direction along axis line A, an outer shape of weight member 20 may be a racetrack shape. Thus, weight member 20 can be made large as compared with a case where the shape of weight member 20 is a shape of straight line. As a result, vibration during a cutting process can be further attenuated.

(7) In cutting tool 100 according to (3), main body portion 10 may be provided with a hollow portion 9 surrounded by an inner wall surface 6. Weight member 20 may be disposed in hollow portion 9 with weight member 20 being separated from inner wall surface 6. Weight member 20 may be provided with a through hole 24. Each of the plurality of anti-vibration members 8 may include: a pin member 12 that extends through through hole 24 and that is attached to inner wall surface 6; and an elastic member 13 that surrounds pin member 12 and that is in contact with weight member 20 in through hole 24. When viewed in the direction along axis line A, an outer shape of weight member 20 may be a racetrack shape.

In cutting tool 100 according to (7), since weight member 20 is separated from inner wall surface 6, weight member 20 is movable in hollow portion 9. Thus, weight member 20 is vibrated in a phase opposite to that of the vibration of main body portion 10. Therefore, anti-vibration member 8 functions as a dynamic vibration absorber. Therefore, as compared with a case where weight member 20 is in contact with inner wall surface 6, vibration during a cutting process can be further attenuated. Further, weight member 20 can attenuate vibration by friction between weight member 20 and elastic member 13 and friction between elastic member 13 and pin member 12. Therefore, not only vibration in the radial direction but also vibration in each of the axial direction and the circumferential direction can be efficiently attenuated. Further, in the case where the outer shape of weight member 20 is a racetrack shape when viewed in the direction along axis line A, weight member 20 can be made large as compared with a case where the shape of weight member 20 is a shape of straight line. As a result, vibration during a cutting process can be further attenuated.

(8) A cutting processing device according to the present disclosure includes: cutting tool 100 according to any one of (1) to (7); and an adapter 40 that holds main body portion 10.

Details of Embodiments of the Present Disclosure

Next, embodiments of the present disclosure will be described in detail with reference to figures. It should be noted that in the below-described figures, the same or corresponding portions are denoted by the same reference characters, and will not be described repeatedly.

First Embodiment

First, a configuration of a cutting tool 100 according to a first embodiment will be described.

FIG. 1 is a schematic plan view showing a configuration of a cutting tool according to a first embodiment. As shown in FIG. 1, cutting tool 100 according to the first embodiment is, for example, a pin miller cutter. Cutting tool 100 according to the first embodiment is a cutting tool 100 rotatable about an axis line A, and mainly includes a main body portion 10, a plurality of cutting inserts 7, and a plurality of anti-vibration members 8. Main body portion 10 has an annular shape. Main body portion 10 has an inner circumferential surface 4 and an outer circumferential surface 3. Outer circumferential surface 3 is opposite to inner circumferential surface 4. Each of inner circumferential surface 4 and outer circumferential surface 3 surrounds an axis line A.

Each of cutting inserts 7 is attached to at least one of inner circumferential surface 4 and outer circumferential surface 3. In cutting tool 100 according to the first embodiment, cutting insert 7 is attached to inner circumferential surface 4 of main body portion 10. Cutting insert 7 is exposed at inner circumferential surface 4. The number of cutting inserts 7 is not particularly limited, but is, for example, 36. Cutting inserts 7 may be disposed at equal intervals in the circumferential direction of main body portion 10.

Cutting inserts 7 have, for example, vertical inserts 7a and horizontal inserts 7b For example, each of vertical inserts 7a is disposed such that the longitudinal direction of its rake face is along a radial direction of main body portion 10. For example, each of horizontal inserts 7b is disposed such that the longitudinal direction of its rake face is along an axial direction of main body portion 10. The axial direction is a direction parallel to axis line A. The radial direction is a direction perpendicular to axis line A.

Figure 2:
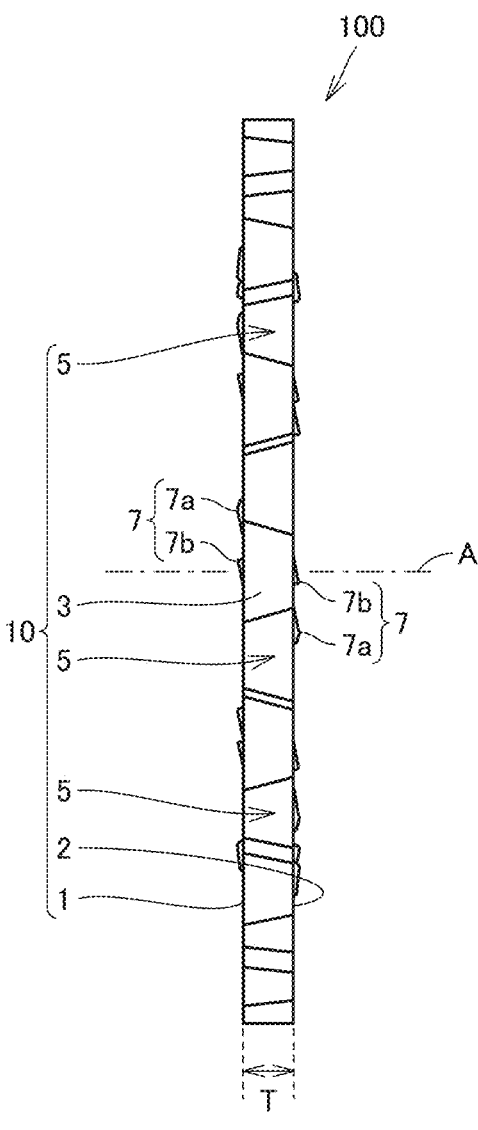
FIG. 2 is a schematic side view showing the configuration of the cutting tool according to the first embodiment.

FIG. 2 is a schematic side view showing the configuration of the cutting tool according to the first embodiment. Main body portion 10 has a first main surface 1 and a second main surface 2. Second main surface 2 is located opposite to first main surface 1. First main surface 1 is contiguous to each of outer circumferential surface 3 and inner circumferential surface 4. Similarly, second main surface 2 is contiguous to each of outer circumferential surface 3 and inner circumferential surface 4. Second main surface 2 is substantially parallel to first main surface 1. Each of first main surface 1 and second main surface 2 is substantially perpendicular to axis line A.

As shown in FIG. 2, a portion (cutting edge) of vertical insert 7a may protrude from each of first main surface 1 and second main surface 2 in the direction parallel to axis line A when viewed in the direction perpendicular to axis line A. Similarly, when viewed in the direction perpendicular to axis line A, a portion (cutting edge) of horizontal insert 7b may protrude from each of first main surface 1 and second main surface 2 in the direction parallel to axis line A In the direction parallel to axis line A, a thickness T of main body portion 10 is, for example, 17 mm or more and 30 mm or less.

As shown in FIG. 1, a plurality of attachment recesses 5 may be provided in outer circumferential surface 3 of main body portion 10. The plurality of attachment recesses 5 may be disposed at equal intervals in the circumferential direction of main body portion 10. The number of attachment recesses 5 is not particularly limited, but is, for example, 16. As shown in FIG. 2, when viewed in the direction perpendicular to axis line A, the width of each of the plurality of attachment recesses 5 in the circumferential direction of main body portion 10 may become wider in a direction from first main surface 1 toward second main surface 2.

As shown in FIG. 1, each of the plurality of anti-vibration members 8 is provided at main body portion 10. As shown in FIG. 1, when viewed in the direction along axis line A, each of the plurality of anti-vibration members 8 may be disposed on an imaginary circle B centered on axis line A. When viewed in the direction along axis line A, the plurality of anti-vibration members 8 may be disposed at equal intervals in the circumferential direction of imaginary circle B. The number of anti-vibration members 8 is not particularly limited, but is, for example, 8. The plurality of anti-vibration members 8 are not limited to being disposed at equal intervals. The plurality of anti-vibration members 8 may be disposed at unequal intervals.

Figure 3:
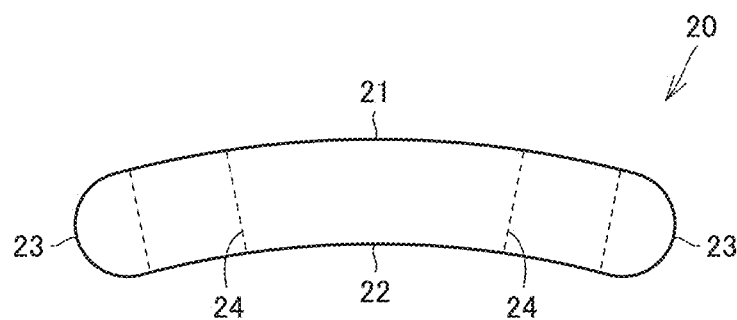
FIG. 3 is a schematic plan view showing a configuration of a weight member of the cutting tool according to the first embodiment.

FIG. 3 is a schematic plan view showing a configuration of a weight member of the cutting tool according to the first embodiment. Each of the plurality of anti-vibration members 8 includes a weight member 20. Weight member 20 is composed of a material having a specific gravity larger than a specific gravity of the material of main body portion 10. The material of main body portion 10 is, for example, a cemented carbide. The cemented carbide is obtained by sintering tungsten carbide (WC) using cobalt (Co) as a binding aid. The specific gravity of the cemented carbide is, for example, 13 g/cm³ or more and 15 g/cm³ or less. It should be noted that when main body portion 10 is constituted of a plurality of parts and the plurality of parts have different specific gravities, "the specific gravity of the main body portion" is obtained by dividing "the total value of the weights of the plurality of parts of the main body portion" by "the total value of the volumes of the plurality of parts of the main body portion" (i.e., average specific gravity).

The material of weight member 20 is, for example, a tungsten alloy including tungsten as a main component. The tungsten alloy includes, for example, tungsten, nickel, and copper. The tungsten alloy may include, for example, tungsten, nickel, and iron. The specific gravity of the tungsten alloy is, for example, more than 13 g/cm³ and 18.3 g/cm³ or less.

As shown in FIG. 3, the outer shape of weight member 20 may be a racetrack shape when viewed in the direction along axis line A. The racetrack shape may be a shape surrounded by: an arc that is a portion of a sector and that has a radius of curvature larger than that of imaginary circle B centered on axis line A; an arc that has a central angle substantially equal to that of the foregoing arc and that has a radius of curvature smaller than that of imaginary circle B centered on axis line A, and respective curves that connect ends of the former arc and adjacent ends of the latter arc. Each of the curves may be an arc. Portions of the racetrack shape corresponding to the curves may be line segments instead of the curves. The axis of the racetrack shape in the longitudinal direction may be a straight line. The racetrack shape may be a curved racetrack shape with the axis of the racetrack shape in the longitudinal direction being along a portion of the circumference. Preferably, the axis of the racetrack shape in the longitudinal direction may be along imaginary circle B centered on axis line A. The racetrack shape may be an oval track shape. Weight member 20 has a first end surface 21, a second end surface 22, and third end surfaces 23. Weight member 20 is provided with through holes 24. Each of through holes 24 is opened in each of first end surface 21 and second end surface 22. The number of through holes 24 is not particularly limited, but is, for example, 2.

Each of third end surfaces 23 connects first end surface 21 and second end surface 22 to each other. As shown in FIG. 3, when viewed in the direction along axis line A, each of first end surface 21 and third end surface 23 is a curved surface that protrudes toward the outer side. Second end surface 22 is a curved surface that protrudes toward the inner side. The radius of curvature of second end surface 22 may be larger than the radius of curvature of third end surface 23. The radius of curvature of first end surface 21 may be larger than the radius of curvature of second end surface 22.

Figure 4:
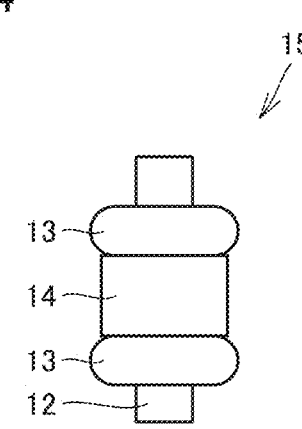
FIG. 4 is a schematic plan view showing a configuration of an insertion member.

FIG. 4 is a schematic plan view showing a configuration of an insertion member. Each of the plurality of anti-vibration members 8 has an insertion member 15. Insertion member 15 has, for example, a pin member 12, elastic members 13, and a locator 14. Pin member 12 is a member having a bar shape. Pin member 12 is composed of a metal, for example. Locator 14 is a member having a cylindrical shape. Locator 14 is composed of, for example, a resin. Pin member 12 extends through a hollow portion of locator 14. Each of elastic members 13 is a member having an annular shape. Elastic member 13 is, for example, an O-ring Elastic member 13 is composed of a rubber, for example.

The number of elastic members 13 is not particularly limited, but is, for example, 2. Pin member 12 extends through the hollow portion of each of elastic members 13. Elastic member 13, locator 14, and elastic member 13 are disposed in this order along the longitudinal direction of pin member 12. From another viewpoint, it can be said that locator 14 is sandwiched between two elastic members 13, for example. It should be noted that the longitudinal direction of pin member 12 corresponds to the radial direction of main body portion 10.

In the axial direction of pin member 12, the length of pin member 12 is larger than the total of the thickness of locator 14 and a thickness twice as large as the thickness of elastic member 13. In the axial direction of pin member 12, the thickness of elastic member 13 may be smaller than the thickness of locator 14. The diameter of pin member 12 is smaller than the outer diameter of elastic member 13. The diameter of pin member 12 is smaller than the outer diameter of locator 14. The outer diameter of locator 14 may be smaller than the outer diameter of elastic member 13. The thickness of elastic member 13 may be smaller than the outer diameter of elastic member 13.

Figure 5:
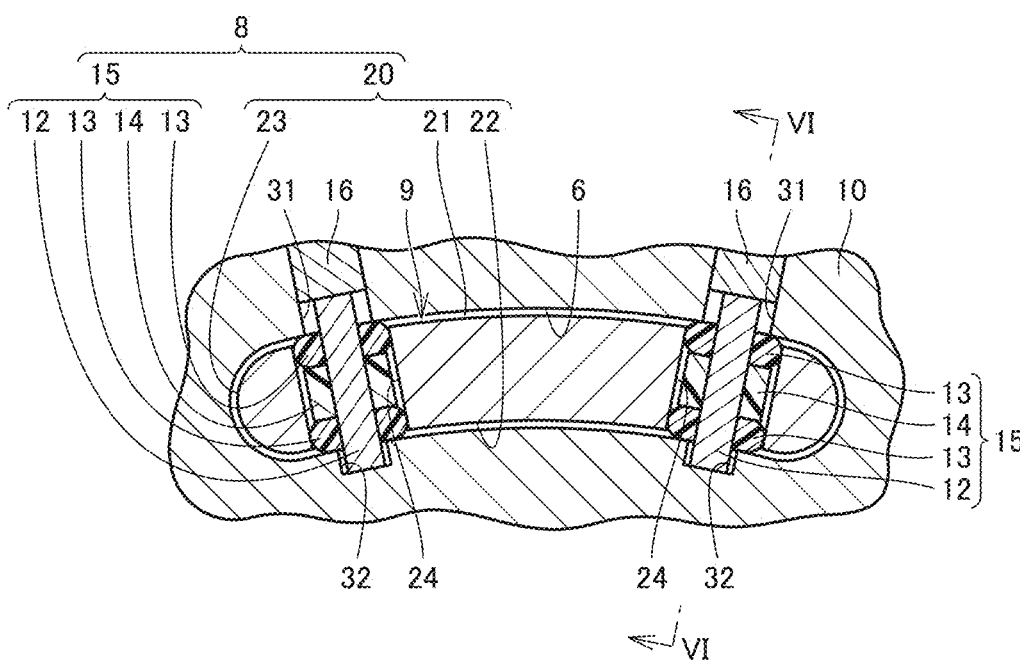
FIG. 5 is a schematic cross sectional view showing a state in which an anti-vibration member is attached to a main body portion.

FIG. 5 is a schematic cross sectional view showing a state in which the anti-vibration member is attached to the main body portion. The cross section shown in FIG. 5 is a cross section perpendicular to axis line A. As shown in FIG. 5, main body portion 10 is provided with a hollow portion 9. Hollow portion 9 is surrounded by an inner wall surface 6. Weight member 20 may be disposed in hollow portion 9 with weight member 20 being separated from inner wall surface 6. Hollow portion 9 extends through main body portion 10 along the direction parallel to axis line A. Hollow portion 9 is opened in each of first main surface 1 and second main surface 2.

Inner wall surface 6 is provided with, for example, first recesses 31 and second recesses 32. Each of first recesses 31 is located on the outer circumferential surface side with respect to pin member 12. One end of pin member 12 is disposed in first recess 31. First recess 31 may be opened in outer circumferential surface 3. Each of second recesses 32 is located on the inner circumferential surface side with respect to pin member 12. The other end of pin member 12 is disposed in second recess 32. Each of first recess 31 and second recess 32 extends, for example, along the radial direction of main body portion 10. Cutting tool 100 may have fixing members 16. Each of fixing members 16 is disposed in first recess 31. Fixing member 16 presses pin member 12 against main body portion 10.

As shown in FIG. 5, through hole 24 of weight member 20 is disposed to communicate with each of first recess 31 and second recess 32. Pin member 12 extends through through hole 24. Pin member 12 is attached to inner wall surface 6 of hollow portion 9. Elastic member 13 surrounds pin member 12. Elastic member 13 is in contact with weight member 20 in through hole 24. Elastic member 13 is in contact with the inner surface of through hole 24 and pin member 12 in the circumferential direction of main body portion 10. Elastic member 13 is in contact with inner wall surface 6 and locator 14 in the longitudinal direction of pin member 12.

Each of first end surface 21 and second end surface 22 faces inner wall surface 6 of hollow portion 9 in the radial direction of main body portion 10. In the radial direction of main body portion 10, first end surface 21 is located between second end surface 22 and outer circumferential surface 3. In the radial direction of main body portion 10, second end surface 22 is located between first end surface 21 and inner circumferential surface 4. Third end surface 23 faces inner wall surface 6 of hollow portion 9 in the circumferential direction of main body portion 10.

Figure 6:
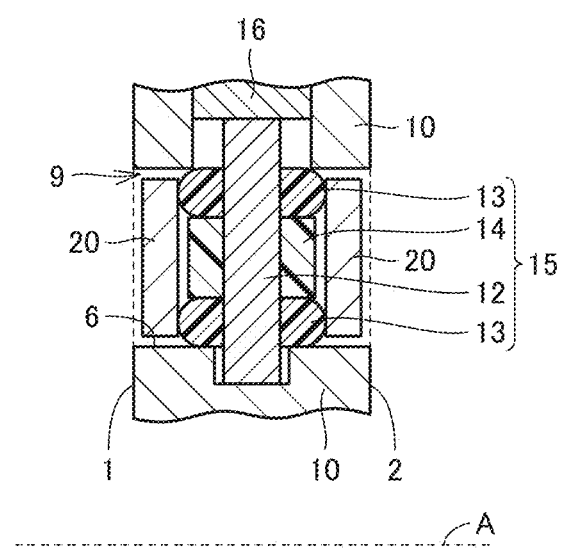
FIG. 6 is a schematic cross sectional view along a line VI-VI of FIG. 5.

FIG. 6 is a schematic cross sectional view along a line VI-VI of FIG. 5. The cross section shown in FIG. 6 is a cross section parallel to axis line A. As shown in FIG. 6, in the direction parallel to axis line A, elastic member 13 is in contact with each of pin member 12 and weight member 20. It is desirable that in the direction parallel to axis line A, weight member 20 is accommodated in hollow portion 9 formed to be surrounded by inner wall surface 6 and does not stick out from hollow portion 9. From another viewpoint, it can be said that weight member 20 is located between first main surface 1 and second main surface 2 in the direction parallel to axis line A.

The number of pin members 12 in one anti-vibration member 8 is not particularly limited, but is, for example, 2 or more. When one pin member 12 is provided therein, weight member 20 may be rotated about pin member 12, with the result that a portion of weight member 20 may stick out from hollow portion 9. When two or more pin members 12 are provided, weight member 20 can be suppressed from sticking out from hollow portion 9.

Second Embodiment

Next, a configuration of a cutting processing device 200 according to a second embodiment will be described.

Figure 7:
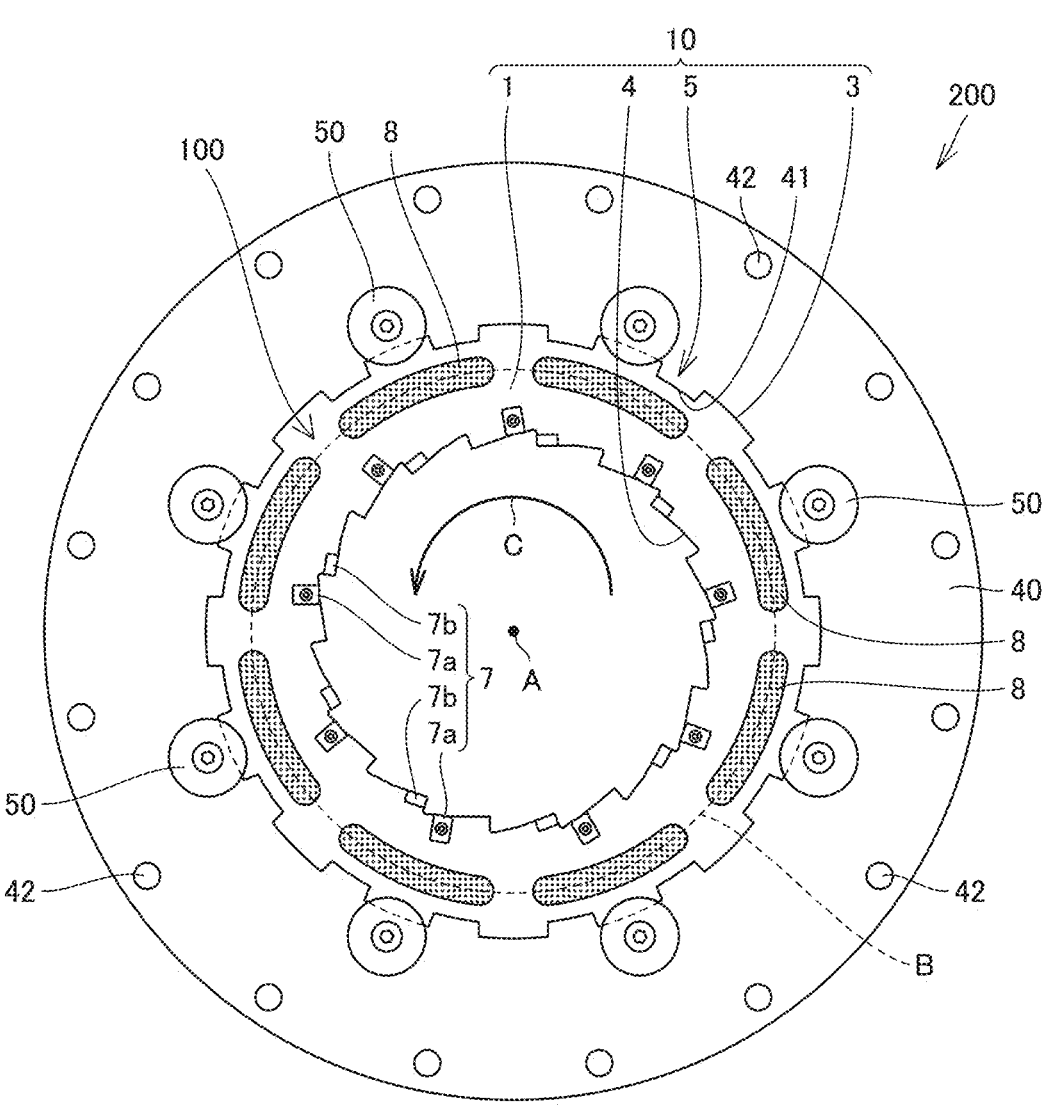
FIG. 7 is a schematic plan view showing a configuration of a cutting processing device according to a second embodiment.

FIG. 7 is a schematic plan view showing the configuration of the cutting processing device according to the second embodiment. As shown in FIG. 7, cutting processing device 200 according to the second embodiment mainly includes cutting tool 100 according to the first embodiment, an adapter 40, and attachment members 50. Cutting tool 100 includes main body portion 10, cutting inserts 7, and anti-vibration members 8. Main body portion 10 is attached to adapter 40. Adapter 40 holds main body portion 10. As shown in FIG. 7, adapter 40 surrounds main body portion 10 when viewed in the direction parallel to axis line A. It should be noted that instead of cutting tool 100 according to the first embodiment, a cutting tool 100 according to a below-described third embodiment or a cutting tool 100 according to a below-described fourth embodiment may be used.

As shown in FIG. 7, adapter 40 is, for example, an annular member. A plurality of attachment protrusions 41 are provided on the inner circumferential side of adapter 40. The plurality of attachment protrusions 41 of adapter 40 are respectively inserted into the plurality of attachment recesses 5 provided in main body portion 10. From another viewpoint, it can be said that the plurality of attachment protrusions 41 of adapter 40 are respectively engaged with the plurality of attachment recesses 5 provided in main body portion 10. Main body portion 10 is fixed to adapter 40 by attachment members 50.

As shown in FIG. 7, adapter 40 may be provided with a plurality of attachment holes 42. The plurality of attachment holes 42 are used for attachment to an external rotating device (not shown) Rotation of the rotating device causes rotation of adapter 40. The rotation of adapter 40 causes rotation of cutting tool 100 along a rotation direction C. Rotational force of the rotating device is transmitted to cutting tool 100 via adapter 40. Rotation direction C of cutting tool 100 corresponds to the circumferential direction of main body portion 10.

Third Embodiment

Next, a configuration of a cutting tool 100 according to a third embodiment will be described. Cutting tool 100 according to the third embodiment is different from cutting tool 100 according to the first embodiment mainly in terms of such a configuration that the shape of anti-vibration member 8 is a shape of straight line, and the other configurations are the same as those of cutting tool 100 according to the first embodiment. Hereinafter, the configuration different from that of cutting tool 100 according to the first embodiment will be mainly described.

Figure 8:
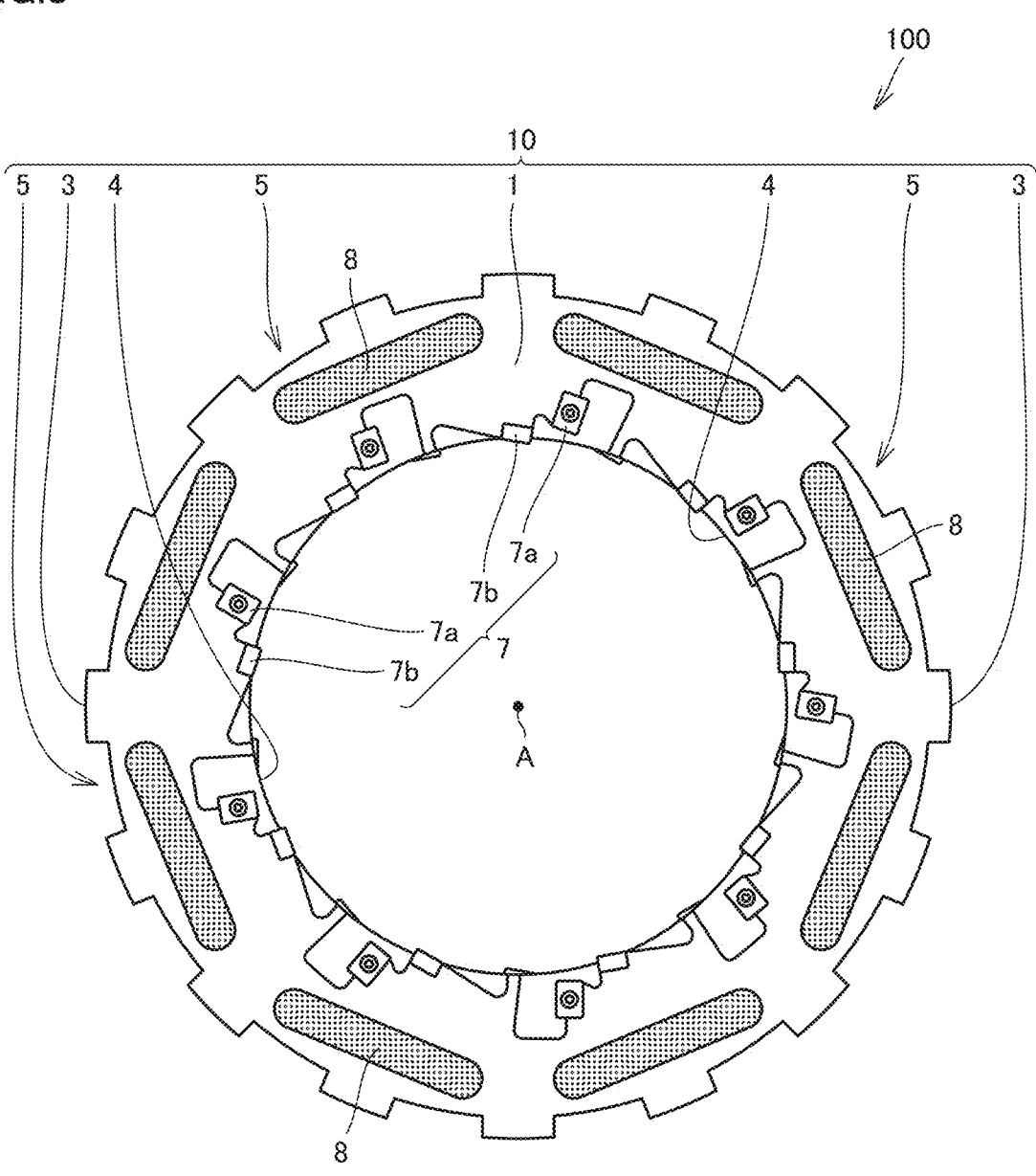
FIG. 8 is a schematic plan view showing a configuration of a cutting tool according to a third embodiment.

FIG. 8 is a schematic plan view showing the configuration of the cutting tool according to the third embodiment. As shown in FIG. 8, when viewed in the direction parallel to axis line A, the shape of each of the plurality of anti-vibration members 8 is a shape of straight line. When viewed in the direction parallel to axis line A, each of the plurality of anti-vibration members 8 extends in a direction intersecting outer circumferential surface 3. The number of anti-vibration members 8 is not particularly limited, but is, for example, 8. As shown in FIG. 8, when viewed in the direction along axis line A, the outer shape of weight member 20 may be a shape of rounded rectangle.

Figure 9:
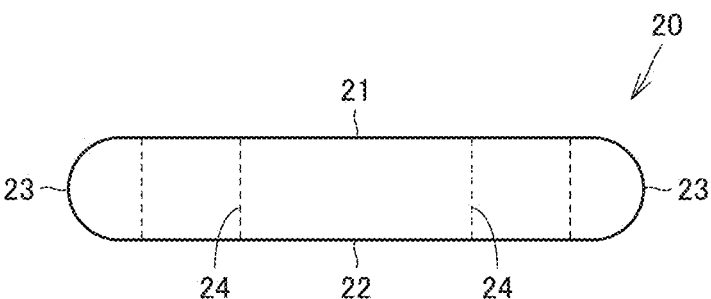
FIG. 9 is a schematic plan view showing a configuration of a weight member of the cutting tool according to the third embodiment.

FIG. 9 is a schematic plan view showing the configuration of the weight member of the cutting tool according to the third embodiment. As shown in FIG. 9, when viewed in the direction parallel to axis line A, each of first end surface 21 and second end surface 22 has a shape of straight line. First end surface 21 is parallel to second end surface 22, for example. When viewed in the direction parallel to axis line A, through holes 24 may extend perpendicular to a direction in which each of first end surface 21 and second end surface 22 extends.

Fourth Embodiment

Next, a configuration of a cutting tool 100 according to a fourth embodiment will be described. Cutting tool 100 according to the fourth embodiment is different from cutting tool 100 according to the first embodiment mainly in terms of such a configuration that cutting inserts 7 are attached to outer circumferential surface 3 of main body portion 10, and the other configurations are the same as those of cutting tool 100 according to the first embodiment. Hereinafter, the configuration different from that of cutting tool 100 according to the first embodiment will be mainly described.

Figure 10:
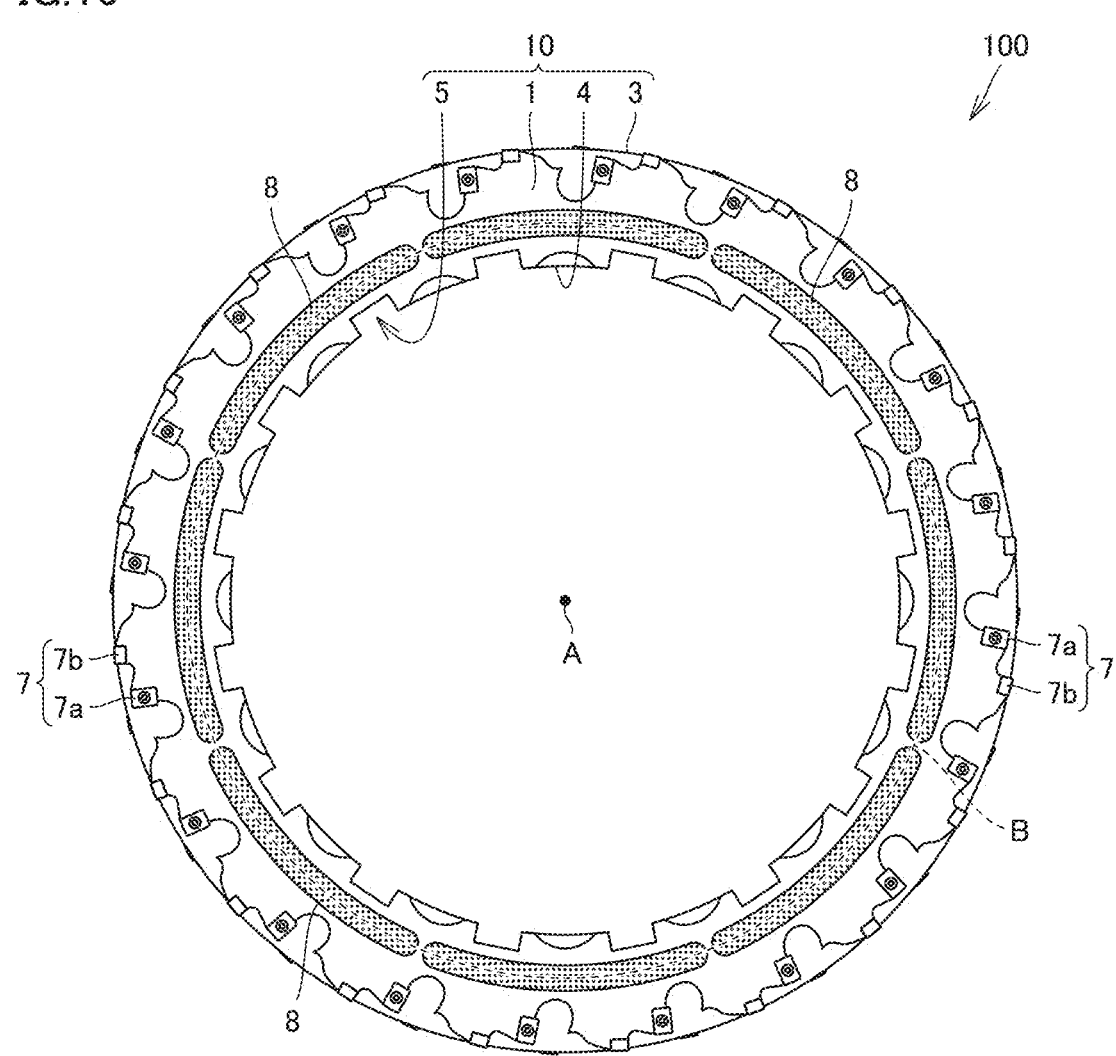
FIG. 10 is a schematic plan view showing a configuration of a cutting tool according to a fourth embodiment.

FIG. 10 is a schematic plan view showing the configuration of the cutting tool according to the fourth embodiment. As shown in FIG. 9, cutting inserts 7 may be attached to outer circumferential surface 3 of main body portion 10. Cutting inserts 7 includes vertical inserts 7a and horizontal inserts 7b. Horizontal inserts 7b are attached to outer circumferential surface 3 of main body portion 10. Vertical inserts 7a are attached to first main surface 1 of main body portion 10. Vertical inserts 7a may be attached to second main surface 2 of main body portion 10. The plurality of attachment recesses 5 may be provided in inner circumferential surface 4 of main body portion 10. The plurality of attachment recesses 5 may be respectively attached to the plurality of attachment protrusions 41 of adapter 40.

Next, functions and effects of cutting tool 100 according to each of the above-described embodiments will be described.

In cutting tool 100 according to the above-described embodiment, each of the plurality of anti-vibration members 8 is provided at main body portion 10. Cutting insert 7 is attached to main body portion 10. Therefore, vibration generated when cutting insert 7 comes into contact with a workpiece is attenuated by each of the plurality of anti-vibration members 8 provided at main body portion 10. Thus, vibration during a cutting process can be efficiently attenuated as compared with a cutting tool 100 in which anti-vibration member 8 is provided at adapter 40.

In cutting tool 100 according to the above-described embodiment, when viewed in the direction along axis line A, each of the plurality of anti-vibration members 8 may be disposed on imaginary circle B centered on axis line A. Thus, distances between axis line A and the plurality of anti-vibration members 8 are the same, with the result that vibration during a cutting process can be more efficiently attenuated.

In cutting tool 100 according to the above-described embodiment, when viewed in the direction along axis line A, the plurality of anti-vibration members 8 may be disposed at equal intervals in the circumferential direction of imaginary circle B. Thus, vibration during a cutting process can be uniformly attenuated in the circumferential direction.

In cutting tool 100 according to the above-described embodiment, main body portion 10 may be provided with hollow portion 9 surrounded by inner wall surface 6. Weight member 20 may be disposed in hollow portion 9 with weight member 20 being separated from inner wall surface 6. Since weight member 20 is separated from inner wall surface 6, weight member 20 is movable in hollow portion 9. Thus, weight member 20 is vibrated in a phase opposite to that of the vibration of main body portion 10. Therefore, anti-vibration member 8 functions as a dynamic vibration absorber. Therefore, as compared with a case where weight member 20 is in contact with inner wall surface 6, vibration during a cutting process can be further attenuated.

In cutting tool 100 according to the above-described embodiment, weight member 20 may be provided with through hole 24. Each of the plurality of anti-vibration members 8 may include: pin member 12 that extends through through hole 24 and that is attached to inner wall surface 6, and elastic member 13 that surrounds pin member 12 and that is in contact with weight member 20 in through hole 24. Weight member 20 can attenuate vibration by friction between weight member 20 and elastic member 13 and friction between elastic member 13 and pin member 12. Therefore, not only vibration in the radial direction but also vibration in each of the axial direction and the circumferential direction can be efficiently attenuated.

In cutting tool 100 according to the above-described embodiment, when viewed in the direction along axis line A, the outer shape of weight member 20 may be a racetrack shape. Thus, weight member 20 can be made large as compared with a case where the shape of weight member 20 is a shape of straight line. As a result, vibration during a cutting process can be further attenuated.

In cutting tool 100 according to the above-described embodiment, main body portion 10 may be provided with hollow portion 9 surrounded by inner wall surface 6. Weight member 20 may be disposed in hollow portion 9 with weight member 20 being separated from inner wall surface 6. Weight member 20 may be provided with through hole 24. Each of the plurality of anti-vibration members 8 may include: pin member 12 that extends through through hole 24 and that is attached to inner wall surface 6; and elastic member 13 that surrounds pin member 12 and that is in contact with weight member 20 in through hole 24. When viewed in the direction along axis line A, the outer shape of weight member 20 may be a racetrack shape.

In cutting tool 100 according to the above-described embodiment, since weight member 20 is separated from inner wall surface 6, weight member 20 is movable in hollow portion 9. Thus, weight member 20 is vibrated in a phase opposite to that of the vibration of main body portion 10. Therefore, anti-vibration member 8 functions as a dynamic vibration absorber. Therefore, as compared with a case where weight member 20 is in contact with inner wall surface 6, vibration during a cutting process can be further attenuated. Further, weight member 20 can attenuate vibration by friction between weight member 20 and elastic member 13 and friction between elastic member 13 and pin member 12. Therefore, not only vibration in the radial direction but also vibration in each of the axial direction and the circumferential direction can be efficiently attenuated. Further, in the case where the outer shape of weight member 20 is a racetrack shape when viewed in the direction along axis line A, weight member 20 can be made large as compared with a case where the shape of weight member 20 is a shape of straight line. As a result, vibration during a cutting process can be further attenuated.

EXAMPLES

Next, a vibration measurement test will be described. First, pin miller cutters according to samples 1 and 2 were prepared. The pin miller cutter according to sample 1 is a comparative example. The pin miller cutter according to sample 1 has no anti-vibration member 8. The pin miller cutter according to sample 2 is an example of the present disclosure. The pin miller cutter according to sample 2 has anti-vibration members 8. The pin miller cutter according to sample 2 is cutting tool 100 according to the first embodiment. Thickness T of main body portion 10 in the axial direction is 17 mm.

Figure 11:
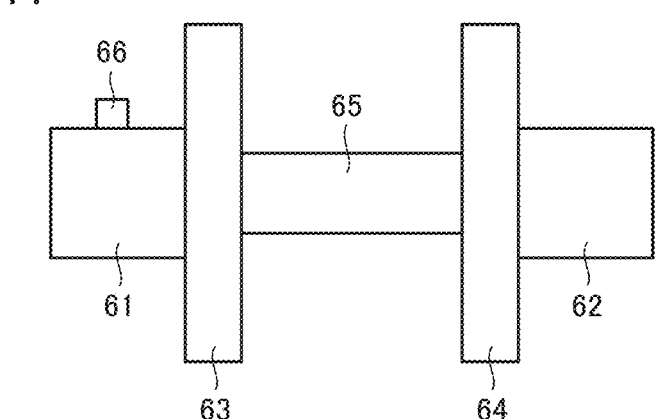
FIG. 11 is a schematic side view showing a vibration measurement method.

Next, a vibration measurement method will be described. FIG. 11 is a schematic side view showing the vibration measurement method. A left cutter 63 is disposed on one side (left side) of a crankshaft 65 in the axial direction. Left cutter 63 is attached to a first motor 61. A right cutter 64 is disposed on the other side (right side) of crankshaft 65 in the axial direction. Right cutter 64 is attached to a second motor 62. A vibration measurement sensor 66 is disposed on first motor 61. Crankshaft 65 was subjected to a cutting process using left cutter 63 and right cutter 64.

A vibration measurement device was a multi-JOB FET analyzer (model: OR35-10J) provided by Toyo Corporation. The number of channels was 10 CH. A measurement range was 2 kHz. A resolution was 2.5 Hz.

Figure 12:
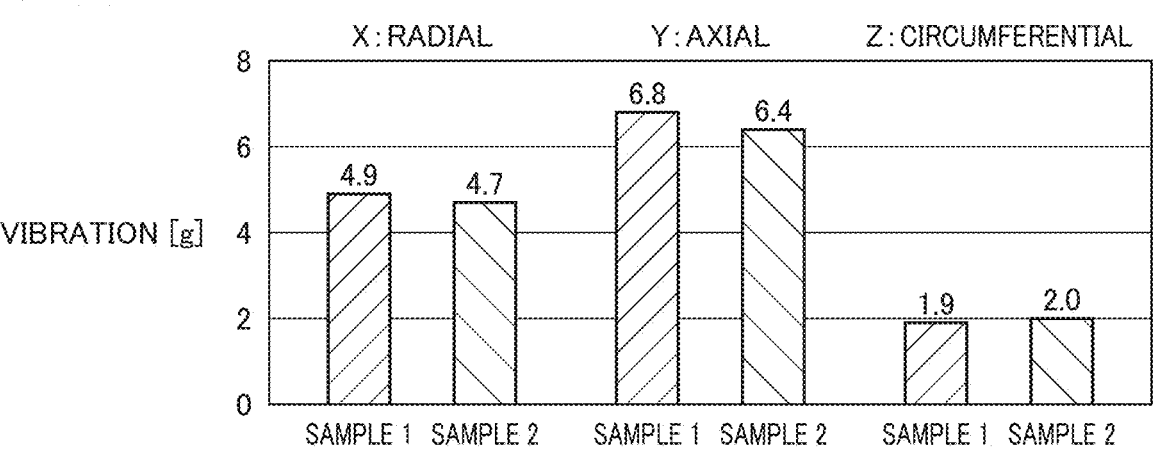
FIG. 12 is a diagram showing vibration measurement results.

FIG. 12 is a diagram showing vibration measurement results. The unit of vibration, g, represents gravitational acceleration, and is 9.8 m/s$^2$. As shown in FIG. 12, in the X (radial) direction and the Y (axial) direction, it was confirmed that the vibration of the pin miller cutter according to sample 2 was smaller than the vibration of the pin miller cutter according to sample 1. In the Z (circumferential) direction, the vibration of the pin miller cutter according to sample 2 was substantially the same as the vibration of the pin miller cutter according to sample 1. In view of the above results, it was confirmed that regarding the vibrations of the pin miller cutter according to sample 2, the vibrations in the X (radial) direction and the Y (axial) direction can be mainly attenuated.

Figure 13:
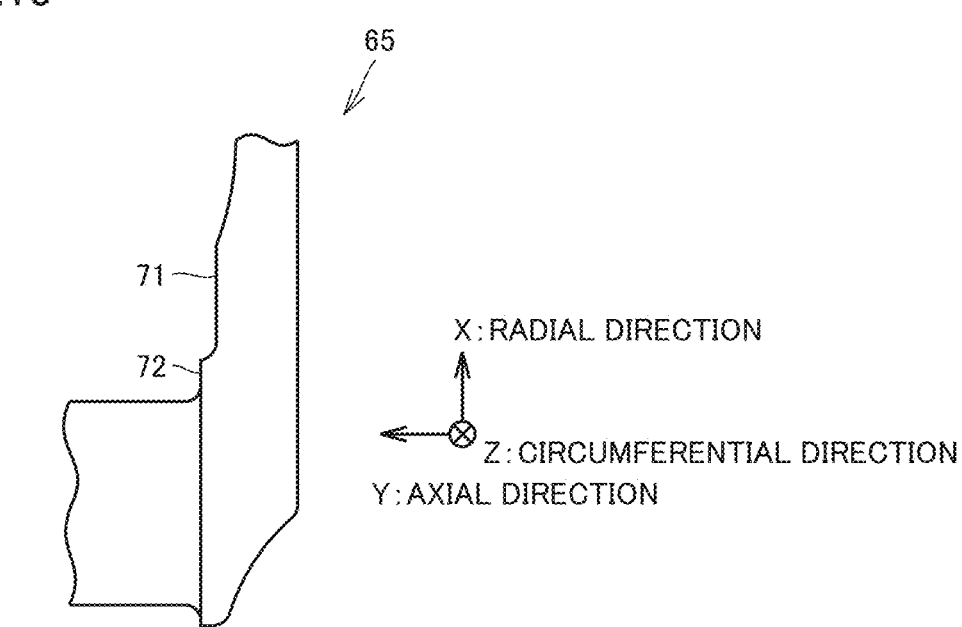
FIG. 13 is a schematic diagram showing configurations of a thrust surface and a cheek surface of a crankshaft.

FIG. 13 is a schematic diagram showing configurations of a thrust surface and a cheek surface of the crankshaft. As shown in FIG. 13, crankshaft 65 has a thrust surface 72 and a cheek surface 71. Cheek surface 71 is located on the outer side with respect to thrust surface 72 in the radial direction. Cheek surface 71 and thrust surface 72 are located at different positions in the axial direction.

After performing a cutting process onto crankshaft 65, a surface roughness (Ra: arithmetic average roughness) was measured at each of thrust surface 72 and cheek surface 71 of crankshaft 65. A surface roughness measurement device was a surface roughness measurement device (model: SV-3200L8) provided by Mitutoyo. A measurement length was 4.8 mm. A measurement speed was 1 mm/sec.

Figure 14:
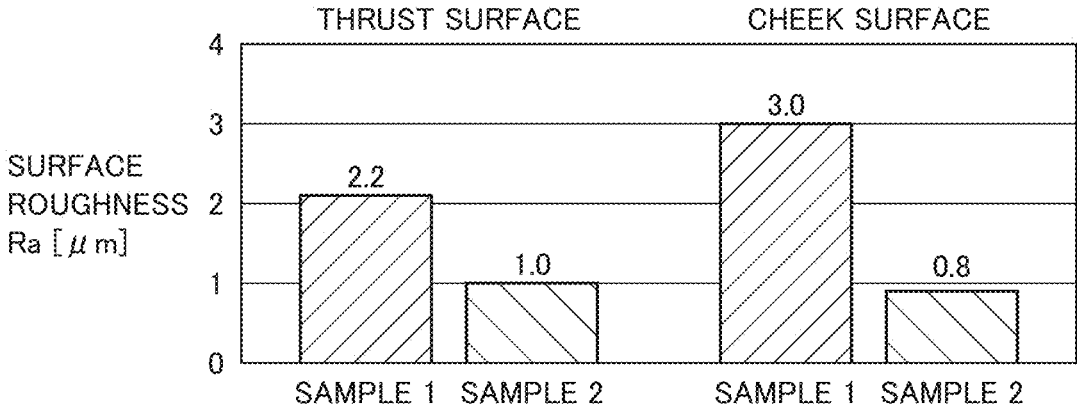
FIG. 14 is a diagram showing surface roughness measurement results.

FIG. 14 is a diagram showing surface roughness measurement results. As shown in FIG. 14, it was confirmed that the surface roughness (Ra) of thrust surface 72 when the pin miller cutter according to sample 2 was used was smaller than the surface roughness (Ra) of thrust surface 72 when the pin miller cutter according to sample 1 was used. Similarly, it was confirmed that the surface roughness of cheek surface 71 when the pin miller cutter according to sample 2 was used was smaller than the surface roughness of cheek surface 71 when the pin miller cutter according to sample 1 was used.

A chatter phenomenon of cutting tool 100 occurs when a processed surface of the workpiece (crankshaft 65) and the cutting edge of cutting tool 100 are repeatedly brought into and out of contact with each other in the axial direction. The chatter phenomenon leads to deterioration of the surface roughness of the processed surface Attenuation of the vibration in the Y (axial) direction is effective in suppressing the chatter phenomenon. As a result, it is considered that the surface roughness of the processed surface can be reduced.

The embodiments and examples disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST 1 first main surface; 2: second main surface; 3: outer circumferential surface; 4: inner circumferential surface; 5: attachment recess; 6: inner wall surface; 7: cutting insert; 7a: vertical insert; 7b: horizontal insert, 8: anti-vibration member; 9: hollow portion; 10: main body portion; 12: pin member; 13: elastic member; 14: locator; 15: insertion member, 16: fixing member; 20: weight member; 21: first end surface; 22: second end surface; 23: third end surface; 24: through hole; 31: first recess; 32: second recess; 40: adapter, 41: attachment protrusion; 42: attachment hole; 50: attachment member; 61: first motor; 62: second motor; 63: left cutter; 64: right cutter; 65: crankshaft; 66: vibration measurement sensor, 71: cheek surface; 72: thrust surface; 100: cutting tool; 200: cutting processing device; A: axis line; B: imaginary circle; C: rotation direction; T: thickness.

The invention claimed is:

1. A cutting tool rotatable about an axis line, the cutting tool comprising:

a main body having an inner circumferential surface and an outer circumferential surface opposite to the inner circumferential surface;

a cutting insert attached to one of the inner circumferential surface and the outer circumferential surface; and a plurality of anti-vibration members provided at the main body, wherein each of the plurality of anti-vibration members includes a weight member composed of a material having a specific gravity larger than a specific gravity of a material of the main body, the main body is provided with a plurality of hollow portions each defined by a respective inner wall surface, each weight member is disposed in a respective hollow portion of the plurality of hollow portions with each weight member being separated from the respective inner wall surface, each weight member is provided with a through hole, each of the plurality of anti-vibration members includes a pin member that extends through the through hole and that is directly attached to the respective inner wall surface, and at least one elastic member that surrounds the pin member and that is in contact with each weight member in the through hole, and a longitudinal direction of the pin member is a radial direction of the main body.

2. The cutting tool according to claim 1, wherein in a view parallel with the axis line, each of the plurality of anti-vibration members is disposed on an imaginary circle centered on the axis line.

3. The cutting tool according to claim 2, wherein in the view parallel with the axis line, the plurality of anti-vibration members are disposed at equal intervals in a circumferential direction of the imaginary circle.

4. The cutting tool according to claim 1, wherein in a view parallel with the axis line, an outer shape of the weight member is a racetrack shape, the racetrack shape defined by: a convex arc, an opposing concave arc, a first convexly curved end connecting a first end of the convex arc to a first end of the concave arc, and a second convexly curved end connecting a second end of the convex arc to a second end of the concave arc.

5. The cutting tool according to claim 1, wherein:
the at least one elastic member includes a first elastic member at one end of each pin member and a second elastic member at another end of each pin member, and
each of the plurality of anti-vibration members further includes a resin locator surrounding each pin member between the first elastic member and the second elastic member.

6. A cutting processing device comprising:
the cutting tool according to claim 1; and
an adapter that holds the main body portion.

* * * * *